United States Patent [19]

Swessel et al.

[11] Patent Number: 4,531,248

[45] Date of Patent: Jul. 30, 1985

[54] DOCKBOARD ASSEMBLY

[75] Inventors: Michael A. Swessel; Norbert Hahn, both of Cudahy, Wis.

[73] Assignee: Rite-Hite Corporation, Milwaukee, Wis.

[21] Appl. No.: 415,174

[22] Filed: Sep. 7, 1982

[51] Int. Cl.³ ............................................. E01D 1/00
[52] U.S. Cl. ..................................................... 14/71.3
[58] Field of Search ................. 14/71.3, 71.5; 254/8 B

[56] References Cited

U.S. PATENT DOCUMENTS

| | | | |
|---|---|---|---|
| 3,579,696 | 5/1971 | Hecker et al. | 14/71.3 |
| 3,699,601 | 10/1972 | Hecker et al. | 14/71.3 |
| 3,967,337 | 7/1976 | Artzberger | 14/71.3 |
| 4,068,338 | 1/1978 | Artzberger | 14/71.3 |

FOREIGN PATENT DOCUMENTS 1049759  11/1966  United Kingdom ................. 14/71.3

Primary Examiner—Stephen J. Novosad
Assistant Examiner—M. Goodwin
Attorney, Agent, or Firm—Neuman, Williams, Anderson & Olson

[57] ABSTRACT

A dockboard assembly is provided having a releasable holding means for restraining the upward pivoting of a ramp means, the latter being urged to pivot upwardly by a biasing means. The holding means is adapted to be adjusted to a release position either by a manually actuated first release means or by a second release means which is actuated automatically only upon the ramp means having assumed a predetermined position of pivotal adjustment and an external upwardly pivoting force exceeding a predetermined magnitude being exerted on the ramp means.

6 Claims, 10 Drawing Figures

U.S. Patent  Jul. 30, 1985  Sheet 1 of 2  4,531,248
FIG. 1
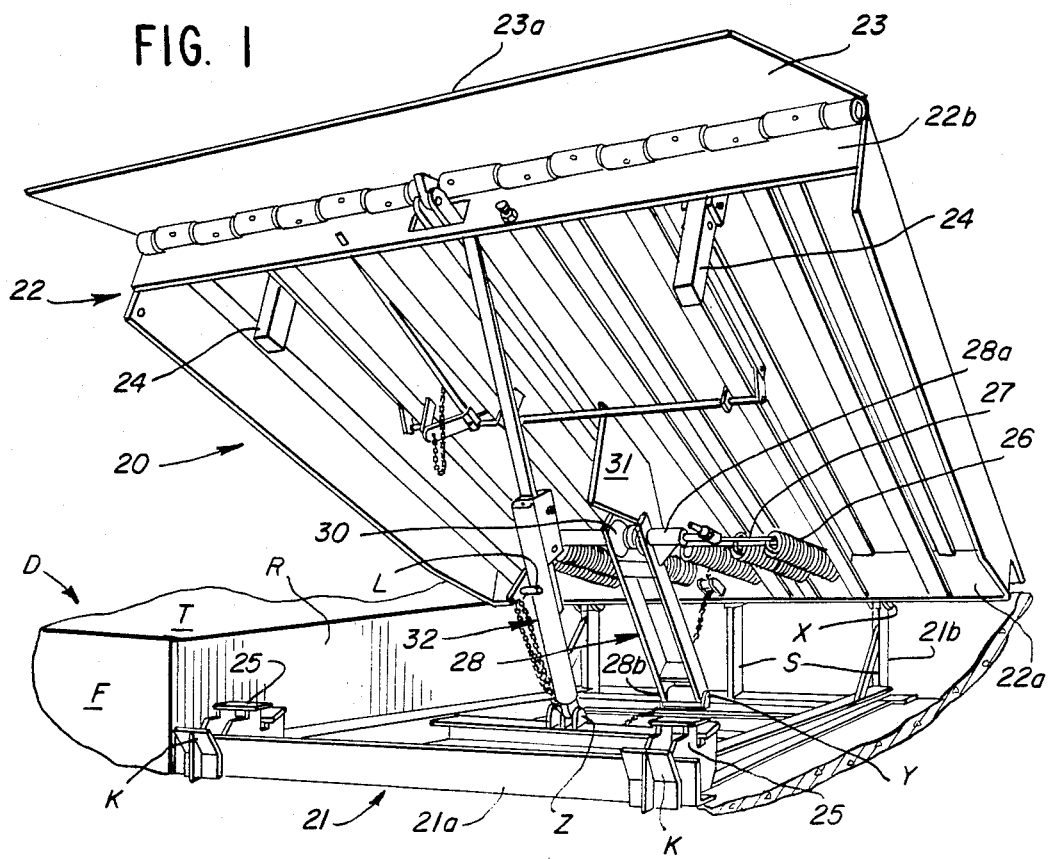
FIG. 2
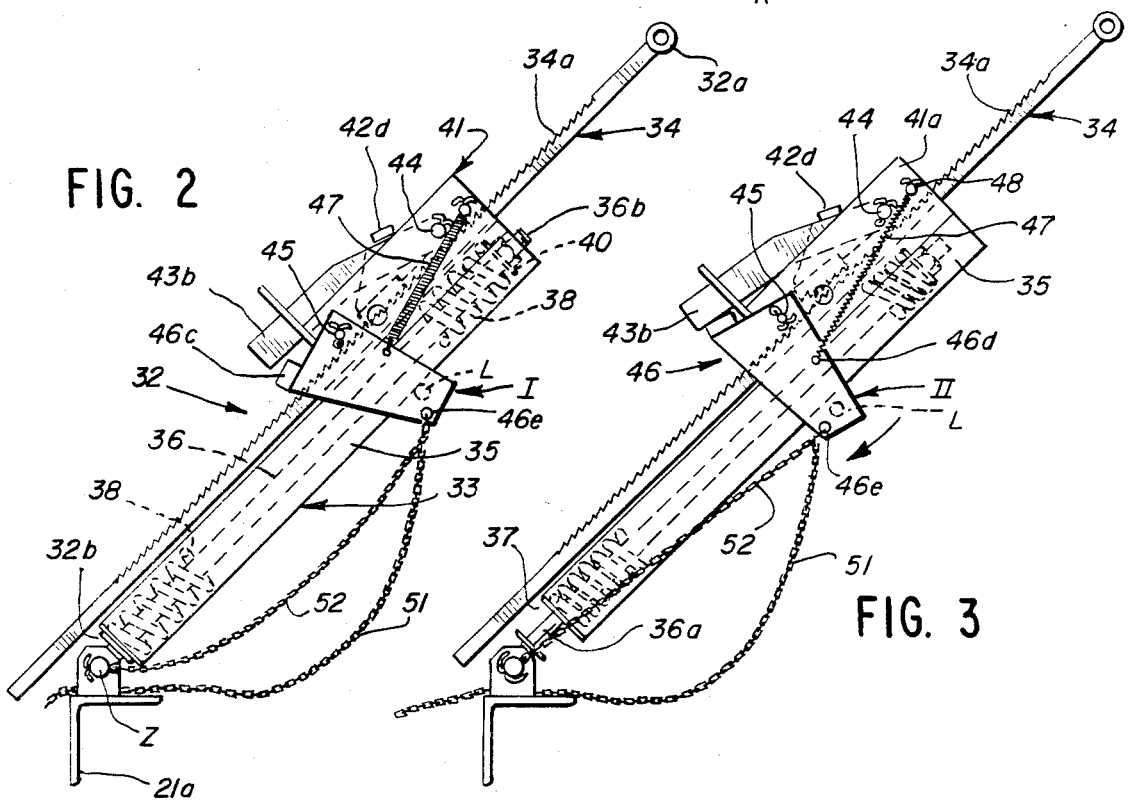
FIG. 3

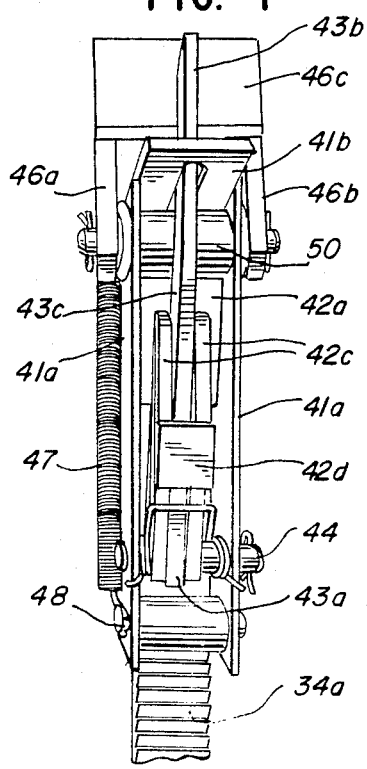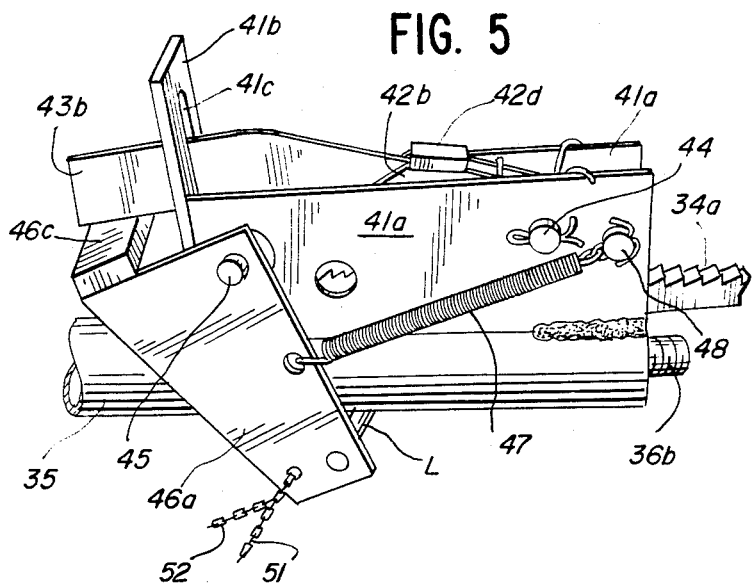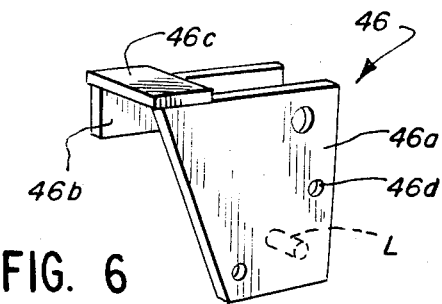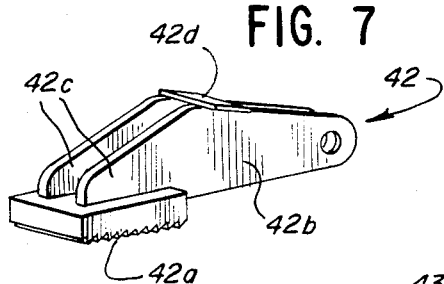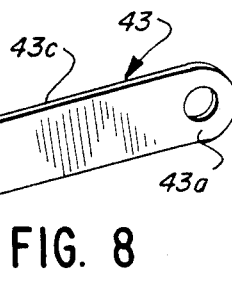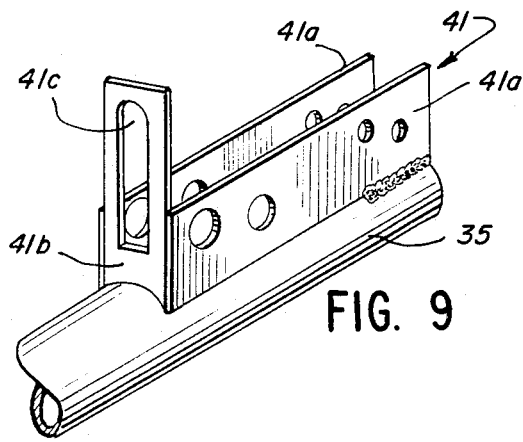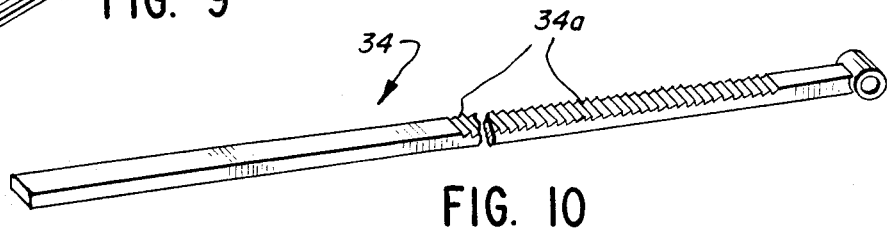

4,531,248

DOCKBOARD ASSEMBLY

BACKGROUND OF THE INVENTION

The use of various types of dockboard assemblies at loading docks and the like has become a common practice for many years. Such assemblies facilitate the loading and unloading of vehicles parked adjacent the docks. The hinged ramp or deck, which forms a part of the assembly, compensates for the height variations in bed of the vehicle and allows forklift trucks and the like to readily move on and off the vehicle bed during loading and unloading of the vehicle. Pivotally connected to the outer edge of the ramp opposite its hinge axis is a lip which is adapted to span the distance between the rear end of the bed of the parked vehicle and the outer edge of the ramp.

In normal practice, when the vehicle is being maneuvered to its parked position or after it has assumed its parked position, the ramp is actuated to an upwardly pivoted position and the lip moved to an outwardly extended position. The ramp with the extended lip is then lowered until the extended lip overlies and contacts the bed of the vehicle.

In some instances, however, when the vehicle bed has been engaged before the vehicle has been backed into engagement with the safety bumpers, normally positioned on the front wall of the dock, such relative movement of the vehicle may cause the ramp to be forcibly pivoted upwardly sometimes creating undue stresses and strains within various components. Such stresses and strains oftentimes cause serious damage to the assembly and/or the dock on which it is mounted.

SUMMARY OF THE INVENTION

Thus, it is an object of this invention to provide an improved dockboard assembly embodying a safety feature which will prevent the aforementioned stresses and strains from developing within the assembly.

It is a further object to provide an improved dockboard assembly having a safety feature which is of simple, compact, inexpensive construction and yet is effective in operation.

It is a still further object to provide an improved dockboard assembly embodying a safety feature which will not interfere with the normal operation of the assembly.

It is a still further object to provide a safety feature of the type described which may be readily installed on existing dockboard assemblies.

Further and additional objects will appear from the description, accompanying drawings, and appended claims.

In accordance with one embodiment of the invention, an improved dockboard assembly is provided having a ramp pivotally connected to a stationary support. Biasing means is connected to the ramp for urging same to pivot upwardly. A releasable holding means is operatively connected to the ramp and support and, when in an operative mode, restrains the biasing means from pivoting the ramp upwardly. The holding means may be selectively adjusted to a release, or inoperative, mode by a manually actuated first release means which is accessible from the ramp or dock, or may be automatically adjusted to a release, or inoperative, mode by a second release means which is operative only when the ramp is in a predetermined position of pivotal adjustment and an upwardly pivoting external force exceeding a predetermined magnitude is exerted on the ramp.

DESCRIPTION

For a more complete understanding of the invention reference should be made to the drawings, wherein FIG. 1 is a fragmentary perspective view of one embodiment of the improved dockboard assembly shown installed on a dock and with the ramp thereof in a normal fully raised position and the lip extended outwardly.

FIG. 2 is an enlarged fragmentary side elevational view of the releasable ramp holding means embodied in the dockboard assembly of FIG. 1 when the ramp thereof is in a normal fully raised position and with the holding means in an operative mode.

FIG. 3 is similar to FIG. 2 but showing the holding means in an inoperative mode due to the dockboard assembly ramp having been pivoted upwardly from its normal fully raised position by an external force exceeding a predetermined magnitude.

FIG. 4 is a fragmentary perspective top view of the ramp holding means shown in FIG. 2.

FIG. 5 is an enlarged fragmentary perspective side view of the holding means of FIG. 4.

FIGS. 6–10 are perspective side views of the various components of the ramp holding means shown in FIGS. 2, 3.

Referring now to the drawings and more particularly to FIG. 1, one form of the improved dockboard assembly 20 is shown mounted within a suitable recess R formed in a conventional loading dock D. The assembly includes a frame 21 having one section 21a thereof fixedly secured to the floor or base surface of the recess. The front portion of the frame is substantially flush with the front wall surface F of the dock D. Projecting upwardly from the rear of frame section 21a is a second section 21b which as illustrated includes a plurality of laterally spaced vertical studs S. The height of the studs S approximates the amount the recess base surface is spaced from the horizontal top surface T of the loading dock.

Pivotally connected to the upper ends of the studs S is the rear edge portion 22a of a ramp or deck 22. Hingedly connected to the front edge portion 22b of the ramp is an elongated lip or extension panel 23. The configuration of the ramp is such that, when the ramp is not in use, it will overlie and close off the open top of the recess and be substantially flush with the top surface T of the dock D. The ramp is supported in this position by the lip 23 assuming a depending position and the free edge 23a of the lip engaging a pair of horizontally spaced keepers K projecting from the front of the frame section 21a. In addition, the ramp is supported in the horizontal non-use position by a pair of feet 24 depending from the underside of the ramp and engaging upwardly extending stops 25 provided on frame section 21a. The ramp 22 is biased to pivot upwardly about its pivotal connection X with the frame studs S by a plurality of heavy duty springs 26. In the illustrated embodiment, each spring has one end thereof connected to the underside of the ramp adjacent the rear edge portion 22a thereof. The opposite ends of springs are connected to a crossbar 27 which is secured to the free end 28a of a follower arm 28 which has the opposite end 28b thereof pivotally connected at Y to frame section 21a. The free end 28a of arm 28 is provided with a roller 30 which engages a cam plate 31 attached to the underside of ramp 22.

To control the pivoting of the ramp 22 from its horizontal non-use position, not shown, to its normal fully raised position as shown in FIG. 1, a ramp holding unit 32 is provided having one end 32a thereof pivotally connected to the underside of the ramp near the front free edge portion. The opposite end 32b of the unit 32 is pivotally connected at Z to the frame section 21a. The pivotal connection Z is disposed forwardly of the pivotal connection Y of follower arm 28.

As seen more clearly in FIGS. 2 and 3, ramp holding unit 32 includes an elongated inner section 33 and an elongated outer section 34. The sections are mounted in telescoping relation. Section 33 comprises an elongated tubular member 35 in which is disposed an axially centered elongated rod 36. One end 36a of the rod projects from the lower end of member 35 and forms the end 32b of unit 32 which is pivotally connected at Z to frame section 21a. The lower end of member 35 is provided with a fixedly mounted washer-like element 37.

Disposed within tubular member 35 and in encompassing relation with rod 36 is a coil spring 38. The lower end of the spring 38 abuts element 37 and the upper end of the spring engages a stop 40 threadably mounted on the free end 36b of rod 36.

Affixed to the exterior of tubular member 35 and adjacent the outer end thereof is a bracket 41 which includes a pair of spaced, substantially parallel plates 41a and a transversely extending spacer piece 41b interconnecting corresponding end portions of the plates 41a. Spacer piece 41b is provided with an elongated vertically extending slot 41c, the function of which will be described more fully hereinafter.

Positioned within the spacing between the bracket plates 41a is a pawl member 42 (FIG. 7), and a rocker arm 43 (FIG. 8). Both the pawl member 42 and one end 43a of rocker arm 43 are pivotally connected to a common pin 44, which is carried by and extends transversely of the bracket plates 41a, see FIGS. 4 and 5. Slidably accommodated within the spacing between bracket plates 41a and disposed beneath pawl member 42 and rocker arm 43 is a ratchet portion 34a of outer section 34, see FIGS. 2 and 3.

Pivotally mounted on bracket plates 41a by a pin 45 is a release member 46 which, when actuated in a clockwise direction about pin 45 (see FIG. 3) causes a serrated jaw portion 42a of the pawl member 42 to become disengaged from the ratchet portion 34a of outer section 34, thereby allowing section 34 to move endwise relative to section 33, as will be described more fully hereinafter.

As seen in FIG. 6, release member 46 includes a pair of outer plates 46a, 46b which slidably engage the exterior surfaces of the bracket plates 41a. Interconnecting the upper edges of plates 46a, 46b is a transversely extending crosspiece 46c. As seen in FIGS. 2 and 3, the crosspiece 46c engages the underside of the free end portion 43b of the pivotally connected rocker arm 43. The free end portion 43b of the arm extends through the elongated slot 41c formed in the spacer piece 41b of bracket 41. The extent to which rocker arm 43 can pivot in a clockwise direction about pin 44 (FIG. 2) is limited by the upper terminus of slot 41c. Counter-clockwise movement of the rocker arm 43 is limited, as will be described more fully hereinafter, by a sleeve-like stop 50 when the release member is in an inoperative position I, see FIG. 2. The release member 46 is biased to normally assume position I by a spring 47 having one end connected to plate 46a at 46d. The opposite end of spring 47 is connected to a pin 48 carried by bracket plate 41a. A laterally extending stop lug L, see FIGS. 1 and 6, is carried by the lower end portion of plate 46a and is adapted to engage the exterior of tubular member 35 and limit the extent to which the spring 47 can bias the release member 46 is a counter-clockwise direction as viewed in FIG. 2.

The pawl member 42, as seen more clearly in FIG. 7, includes a pair of elongated arms 42b arranged in spaced substantially parallel relation with a corresponding one end 42c of each arm interconnected by the jaw portion 42a. The corresponding opposite end of each arm 42b is pivotally connected to the bracket plates 41a by the pin 44. Disposed at approximately mid-length of the arms 42b and affixed to the upper edges thereof is a transversely extending cross-piece 42d. The arms 42b are spaced apart a sufficient amount so as to allow rocker arm 43 to fit therebetween. On the other hand, arms 42b should be arranged sufficiently close to one another so that they will freely fit between the bracket plates 41a, see FIG. 4.

It will be noted in FIG. 7 that the arms 42b of the pawl member 42 are humped at substantially their mid-length. Cross-piece 42d is affixed to the humped portion of the arms so that when the rocker arm 43 and the pawl member 42 are assembled relative to the bracket plates 41a, the cross-piece 42d will overlie a portion of the upper edge 43c of the rocker arm, see FIGS. 4 and 5. To limit the extent to which rocker arm 43 can pivot about pin 44 in a counterclockwise direction, as viewed in FIG. 2, the underside of arm 43 engages the bottom of slot 41c.

A pair of guide rollers 50, see FIG. 4, are positioned between bracket plates 41a for rotation about pins 45 and 48. The periphery of each roller 50 rotatably engages the ratchet portion 34a of outer section 34 as the latter moves endwise relative to inner section 33.

Movement of the release member 46 from its inoperative position I (FIG. 2) wherein the jaw portion 42a is in meshing, locking relation with the ratchet portion 34a of outer section 34, to its operative position II (FIG. 3) wherein the jaw portion is disengaged from the ratchet portion, is effected by either flexible cable or chain 51 or 52. A corresponding end of each cable is connected at 46e to plate 46a of the release member. Cable 51 is of considerable length and has the opposite or free end thereof, not shown, accessible from the exposed surface of ramp 22 and may be manually pulled by the loading dock personnel, when the ramp is to be activated for loading or unloading a vehicle parked adjacent the front wall F of the dock D. Upon the release member 46 assuming its operative position II (FIG. 3), the ramp 22 will be biased to its full upwardly pivoted position, as seen in FIG. 1, whereupon the lip 23 will automatically assume its extended position. Once this has occured the operating dock personnel will normally walk outwardly onto the ramp thereby overcoming the bias of springs 26 and cause the ramp with the lip extended to slowly lower or pivot downwardly until the extended lip engages the top of the bed of the parked vehicle. In some ramp assemblies, once the lip moves to the extended position, the combined weight of the ramp and extended lip will overcome the biasing force of springs 26, causing the ramp and extended lip to automatically pivot downwardly without the need for loading dock personnel to walk out onto the ramp top surface.

The amount of manual pull force exerted on cable 51 must be sufficient to overcome the force of the release member spring 47 and cause the release member 46 to pivot in a clockwise direction about pin 45. When this occurs cross-piece 46c of the release member will push upwardly the free end 43b of rocker arm 43, which in turn will cause the cross-piece 42d of the pawl member 42 to be pushed upwardly by the upper edge 43c of the rocker arm 43 and move the pawl member 42 to its disengaged position with respect to the ratchet portion 34a of outer section 34.

Besides being moved to the operative position II by manually pulling on cable 51, the release member 46 can be automatically moved to such position by cable 52. As seen in FIGS. 2 and 3, cable 52 has a substantially shorter length than cable 51. The lower end of cable 52 is connected to the pivot pin Z which connects the lower end 32b of the ramp holding unit 32 to frame section 21a. While the ramp is disposed in its normal fully raised position (see FIG. 1) or in its horizontal cross-traffic position, not shown, wherein the exposed surface of the ramp is substantially coplanar with the surface T of the dock D, both cables 51, 52 assume a relaxed condition (FIG. 2). If however, while the ramp is in its normal fully raised position, or is locked in a partially raised position, not shown, an external upwardly pivoting force exceeding a predetermined magnitude is applied to either the extended lip 23 or the ramp 22 itself, the tubular member 35, bracket 41 and the outer section 34 will move as a unit endwise of rod 36 causing the spring 38 enclosed within the tubular member 35 to become substantially compressed.

Once the spring 38 is substantially compressed, as seen in FIG. 3, cable 52 is taut and thus, any further external upward force exerted on the ramp 22 will cause the taut cable 52 to exert a clockwise force on release member 46 whereupon the latter will pivot rocker arm 43 in a clockwise direction which, in turn, will pivot pawl member 42 in a clockwise direction disengaging the jaw portion 42a from the ratchet portion 34a of the outer section 34. As soon as the jaw portion 42a disengages the ratchet portion 34a, compressed spring 38 will be released and effect return of the inner section 33 to the relative position shown in FIG. 2, thereby relieving any stress or strain which might otherwise result in the various components of the dockboard assembly and cause damage thereto. Once the section 33 has resumed the relative position shown in FIG. 2, both cables 51, 52 will become relaxed and the jaw portion 42a reengages the ratchet portion 34a and again retains the ramp in a second raised position. If a second external upward force exceeding the force of spring 36 is again imposed on the ramp while the latter is in the second raised position, the aforenoted sequence of events in relieving stress and strain will be repeated.

It should be noted in FIG. 1 that the ramp-holding unit 32 is disposed beneath ramp 22 in such a location that it does not interfere with any other mechanism normally associated with the dockboard assembly. Thus, in certain instances the unit 32 may be readily installed on existing dockboard assembly.

Thus, it will be seen that a dockboard assembly has been described which embodies an improved ramp-holding unit provided with a safety feature which automatically prevents the buildup of dangerous stresses and strains within various components of the assembly when an external upward force above a predetermined magnitude is imposed on the ramp or associated lip.

We claim:

1. In a dockboard assembly having a ramp means pivotally connected to a substantially stationary support means for movement to selected upwardly pivoted raised positions, the improvement comprising a releasable ramp holding means mounted for adjustment between release and non-release positions, when in the release position, said ramp-holding means enabling the ramp means to pivot upwardly to a selected raised position and, when in a non-release position, said ramp-holding means retaining the ramp means in the selected raised position; a manually actuated first release element operatively connected to said ramp-holding means and adapted, when manually actuated, to effect movement of said ramp-holding means to said release position; and a second release element operatively connected to said ramp-holding means and adapted to automatically effect movement of said ramp-holding means to said release position only when said ramp means has assumed a raised position and an external upwardly pivoting force exceeding a predetermined magnitude is exerted on said raised ramp means; said first and second release elements being operative independently of one another; said release elements being flexible cables and the first release element having a substantially greater length than said second release element.

2. The improvement of claim 1 wherein said first release element has one end thereof operatively connected to the ramp-holding means and a second end manually accessible from said ramp means; said second release element has one end thereof operatively connected to the ramp-holding means and a second end adapted to be connected to said stationary support means; said first and second release elements normally maintaining a relaxed condition when said ramp-holding means is in a non-released position.

3. A dockboard assembly comprising support means; ramp means pivotally connected thereto for carrying traffic between a dock and a vehicle parked adjacent thereto; biasing means operatively connected to said ramp means for urging same to pivot upwardly to a raised position; releasable ramp-holding means operative to act in opposition to said biasing means and restraining upward pivoting of said ramp means; a manually actuated first release means operatively connected to said ramp-holding means for selectively effecting release thereof; a second release means operatively connected to said ramp-holding means for automatically effecting release of the latter when said ramp means is in the raised position and is subjected to an external upwardly pivoting force exceeding a predetermined amount; said ramp-holding means including an elongated first member connected at one end portion to said ramp means at a location spaced a substantial distance from the ramp means pivotal axis and movable as a unit with said ramp means; an elongated second member having one end portion connected to the support means and spaced from the ramp means pivotal axis, said first and second members having corresponding second end portions disposed adjacent one another and relatively movable substantially endwise upon pivoting of said ramp means; a first braking element carried on the second end portion of one elongated member; a complemental second braking element pivotally mounted on the other elongated member and normally assuming a braking relation with said first braking element whereby said first and second members assume a relatively fixed relation; a release unit operatively connected to said second member and adjustably mounted for movement between operative and inoperative positions, when in said operative position, said release unit causing said second braking element to assume a nonbraking relation with said first braking element; an elongated first release element having one end portion operatively connected to said support means and a second end portion operatively connected to said release unit and automatically effecting movement of the latter to said operative position only when said ramp means has assumed a raised position and an external upwardly pivoting force exceeding a predetermined magnitude has been exerted on said raised ramp means; an elongated second release element having a first end portion operatively connected to said release unit and a manually engageable second end portion, said second release element being independent of said first release element for selective moving of said release unit to an operative position upon a predetermined manual force being exerted on the second end portion of said second release element; said release elements being flexible cables and said second release element having a substantially greater relative length, corresponding one ends of said cables being connected to said release unit at a substantial distance from the pivoted axis thereof whereby a predetermined pulling force exerted on said unit by either cable will cause said unit to pivot to an operative position; the first release element cable automatically exerting the predetermined pulling force only when said ramp means is subjected to the external upwardly pivoting force exceeding a predetermined amount.

4. The dockboard assembly of claim 3 wherein the cable of the second release element has an end portion thereof accessible from said ramp means for manual pulling.

5. The dockboard assembly of claim 3 wherein the release unit is pivotally connected to a bracket carried on said elongated second member, said release unit being biased to normally assume said inoperative position; the elongated second member comprising a pair of telescoping sections, one section being pivotally connected to the support means and the second section having the bracket mounted thereon; and spring means operatively connected to said sections and biasing same to normally assume a retracted relation, said spring means limiting the extension of said second section relative to said one section.

6. The dockboard assembly of claim 3 wherein the cable of the first release means becomes taut and exerts a predetermined pulling force on said release unit only when the telescoping sections of the elongated second member assume a substantially extended position.

* * * * *